United States Patent [19]

Justus

[11] Patent Number: 5,607,221
[45] Date of Patent: Mar. 4, 1997

[54] HOOK-UP LIGHT FOR A TRUCK TRACTOR

[76] Inventor: Jeff E. Justus, 5700 Goodell Rd., Mantua, Ohio 44255

[21] Appl. No.: 314,868

[22] Filed: Sep. 29, 1994

[51] Int. Cl.⁶ .................................................. B60Q 1/02
[52] U.S. Cl. ...................... 362/83.3; 362/80; 280/420; 439/35
[58] Field of Search ............................ 362/61, 80, 83.3; 280/420, 422; 439/35, 36, 34

[56] References Cited

U.S. PATENT DOCUMENTS

| | | | |
|---|---|---|---|
| 2,660,679 | 11/1953 | Hunt | 280/422 |
| 2,733,033 | 1/1956 | Gundarson | 248/51 |
| 3,005,089 | 10/1961 | Robbins | 362/80 |
| 3,018,364 | 1/1962 | Wenman | 362/426 |
| 3,494,657 | 2/1970 | Tantlinger et al. | 296/28 |
| 3,888,513 | 6/1975 | Pilz et al. | 280/421 |
| 3,915,476 | 10/1975 | Burkle | 280/422 |
| 4,092,034 | 5/1978 | Becker | 280/420 |
| 4,106,081 | 8/1978 | Turturici | 362/61 |
| 4,475,751 | 10/1984 | Nishimura | 285/131 |
| 4,624,472 | 11/1986 | Stuart et al. | 280/420 |
| 5,080,594 | 1/1992 | Swinford | 280/420 |
| 5,143,392 | 9/1992 | Collins | 280/420 |
| 5,184,960 | 2/1993 | Hopkins et al. | 439/35 |

*Primary Examiner*—Y My Quach
*Attorney, Agent, or Firm*—Sand & Sebolt

[57] ABSTRACT

A device for mounting on the rear wall of a truck tractor including a housing and a lamp pivotally mounted on the housing, for illuminating a working area between the tractor and a trailer during hookup or to provide an additional safety warning light behind the tractor. The housing contains a receptacle and a pair of glad hand brackets mounted on side walls of the housing for retaining the plug end of an electrical power cord and the coupling ends of a pair of air pressure lines, respectively, when disconnected from the trailer. One of the male prongs of the receptacle is electrically connected to a switch mounted within the cab of the tractor for illuminating the lamp. This switch normally actuates one of the trailer accessories, such as its marking light, when the power cord is connected to the trailer.

19 Claims, 5 Drawing Sheets

5,607,221

HOOK-UP LIGHT FOR A TRUCK TRACTOR

BACKGROUND OF THE INVENTION

1. Technical Field

The invention relates to a tractor-trailer type vehicle, and in particular, to a device for use with the compressed air and electricity supply between the tractor and trailer. More particularly, the invention relates to a device which is mounted on the rear of the tractor for securely holding the ends of the compressed air lines and electrical power cable when disconnected from the trailer. Even more particularly, the invention relates to a device which provides power for a light mounted on the rear of the tractor to illuminate the area behind the tractor to assist in connecting the trailer thereto.

2. Background Information

Large tractor-trailer trucks utilize braking systems which are energized by a common source of compressed air located in the tractor and supplied to the trailer through a pair of air hoses. The electrical requirements of the tractor and trailer are provided by an electrical system, such as the battery or generator that is located in the tractor, with the electrical power being transferred to the trailer for energizing various accessories, such as the trailer lights, turn signals, etc. by an electrical cable extending between the tractor and the trailer.

The air pressure hoses and electrical power cable extend from the tractor usually through an opening in the tractor body, and the extended ends of the hoses are each provided with a coupler which is attached to a similar coupler on the trailer hose when connecting the trailer to the tractor. The power cable extending from the tractor also has a plug on its extended end which is plugged into a receptacle provided on the end of a trailer cable when the trailer is connected to the tractor. These hoses and power cable must be sufficiently long to extend between the tractor and trailer, and must be safely stored on the tractor when it is disconnected from the trailer. If these hoses and cable are not stored correctly, it presents problems to the truck driver when on the road when "bobtailing", that is, driving the tractor without a trailer being connected thereto.

Various types of devices have been provided on the back of truck tractors for securely, removably storing the air lines, which are generally referred to as "glad hand holders." Other devices are provided for storing or holding the plug end of the power cable when disconnected from the trailer. Examples of these prior art hose and power cable holders are shown in U.S. Pat. Nos. 2,733,033, 4,624,472, 3,915,476, 4,092,934 and 5,143,392. Although these prior glad hand holders and plug storage devices are satisfactory for certain applications, they do not provide the advantages as those provided by the present invention.

It is also desirable to provide a light at the rear of the tractor, which can be illuminated to assist the driver in coupling the tractor to the trailer in an unlighted or dark area, or to provide an additional brake light. There are no known satisfactory devices, of which I am aware, which provide for such an attachment light, except that shown in U.S. Pat. No. 4,092,034. Furthermore, all known devices which provide for such illumination of the rear area of the tractor are difficult, time consuming and expensive to install.

Therefore, the need exists for an improved device for mounting on the rear of a truck tractor which will illuminate the area between the tractor and trailer during hook-up, and which will retain the air lines and electrical power cable in a safe stored position on the rear of the tractor when disconnected from the trailer.

SUMMARY OF THE INVENTION

Objectives of the invention include providing a device which is readily and easily mounted on the rear of a truck tractor, which will illuminate a working area between the tractor and trailer during hook-up by use of a usual trailer accessory switch located within the cab of the tractor, or which can be used to illuminate another brake light.

A further objective of the invention is to provide such a device which is provided with one or a pair of glad hand holders which enables the coupling ends of the air lines to be removably secured therein when disconnected from a trailer.

A still further objective of the invention is to provide such a device in which the plug end of the electric power cable is connected to a complementary-shaped socket mounted in the device, which, in addition to securely retaining the plug end of the power cable in a secure position, also provides the source of electricity to a lamp included in the device, which when energized, lights the area between the tractor and trailer during hook-up.

Another objective of the invention is to provide such a device which can be attached extremely easily and quickly onto the rear of a truck tractor by a pair of attachment bolts without requiring any external wiring, and which is adaptable for most all types and styles of truck tractors presently in use today.

A still further objective of the invention is to provide such a device in which most of the components can be formed of a lightweight, rust-free plastic material which will be unaffected by the harsh environment to which it is exposed behind the truck tractor, yet which will provide the electrical connection between the supply of electricity within the tractor and an illuminating lamp, as well as securely holding the power cord plug end and the coupler ends of the air pressure lines when disconnected from the tractor.

These objectives and advantages are obtained by the improved hook-up light and glad hand holder of the invention, the general nature of which may be stated as including a housing; an electrical receptacle mounted in the housing and containing a plurality of male prongs; a lamp for illuminating a working area between the tractor and trailer; an electrical connection electrically connecting the lamp to at least one of the male prongs of the receptacle; an electrical supply line electrically connecting and extending between the said one male prong and a control switch mounted within the tractor for electrically connecting the lamp to an electrical supply of the tractor; and bracket means mounted on the housing for removably retaining at least one air line thereon when the air line is disconnected from the trailer.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
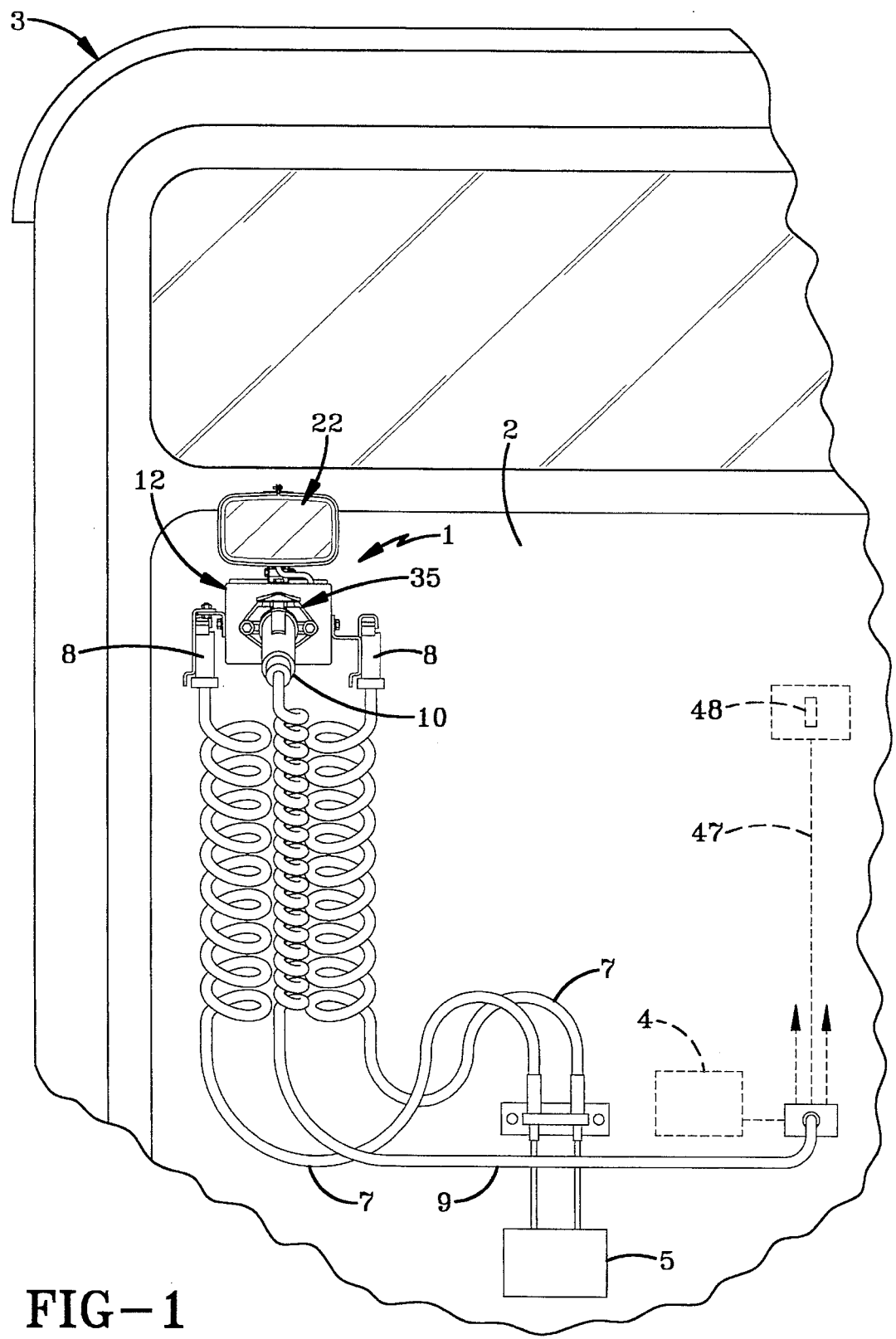
FIG. 1 is a fragmentary diagrammatic elevational view showing the hook-up light and glad hand holder of the present invention mounted on the back of a truck tractor and shown connected to an activating switch within the cab thereof.
Figure 10:
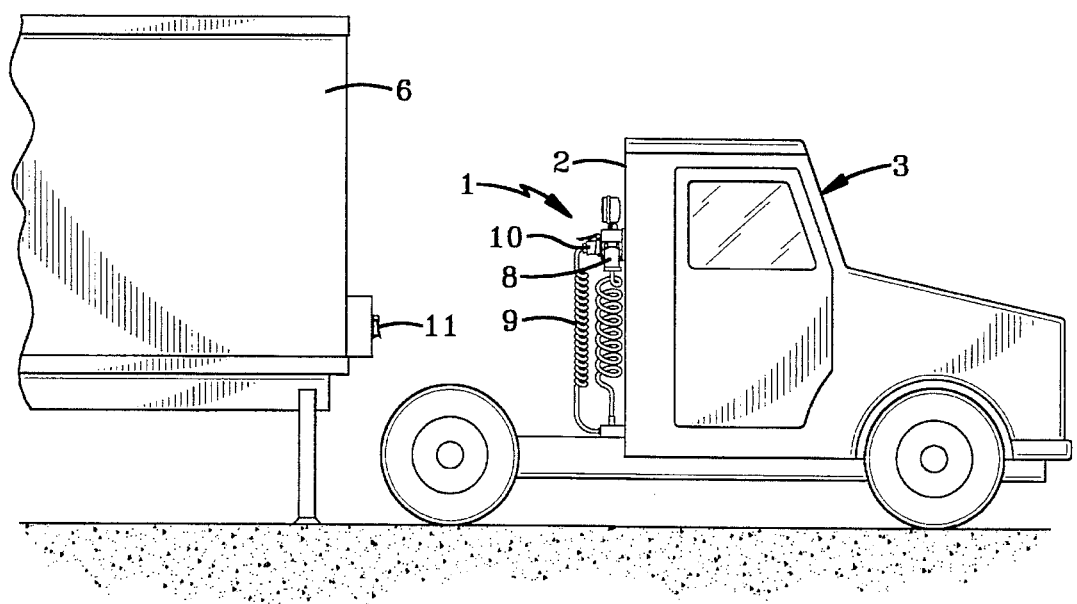
FIG. 10 is a fragmentary diagrammatic view showing a tractor and trailer with which the device of the present invention will be utilized in disconnected position.

The improved hook-up light and glad hand holder of the invention is indicated generally at 1, and is shown in FIG. 1 mounted on a rear panel 2 of a truck tractor 3. Tractor 3 is of a usual type of an overland tractor-trailer combination. Tractor 3 will include a usual source of electricity 4, such as a battery, vehicle generator or combination thereof, and source of pressurized air 5, such as a compressor. Electricity source 4 and pressurized air source 5 may be mounted at various locations within the tractor and will supply the electricity and pressurized air for a usual trailer 6 (FIG. 10) when coupled to tractor 3.

As shown in FIG. 1, most tractors will include a pair of pressurized air lines 7, which are connected to compressor 5. Each air line which will terminate in an end coupler 8, which is connected to another coupler (11) located on the trailer for controlling the trailer brakes. A power cable 9 will be connected to electricity supply 4, and will terminate in a plug end 10. Plug end 10 will be inserted into a mating receptacle (not shown) located on the trailer to be connected to tractor 3 for supplying electricity to the various trailer lights and accessories. The above-described electrical supply and air supply, and air lines 7 and electrical cable 9 are standard on most truck tractors.

Figure 9:
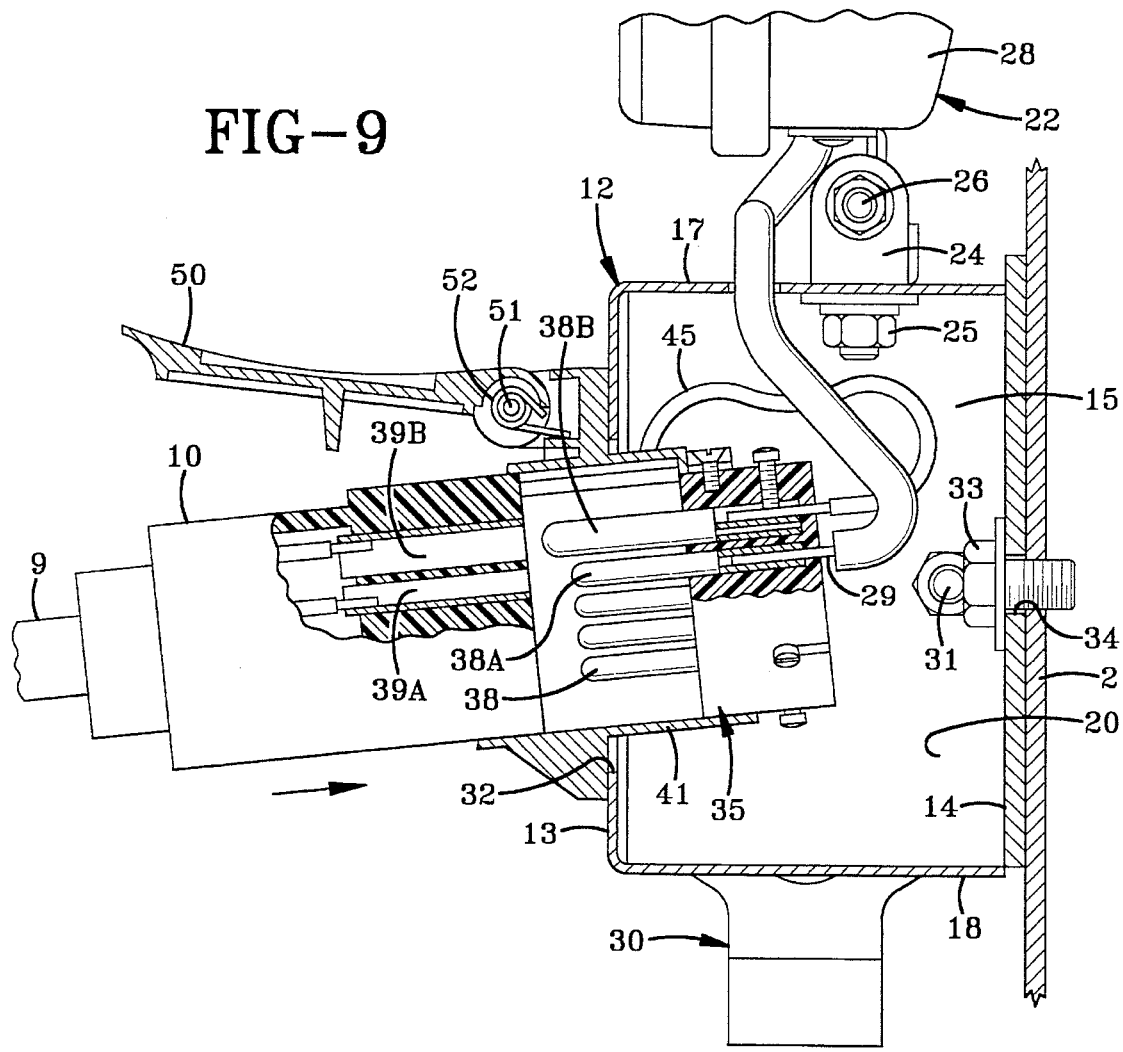
FIG. 9 is an enlarged fragmentary side elevational view with portions shown in section, showing the device attached to a tractor rear panel, and showing the light connected to the receptacle and a plug of the power cable being inserted therein.

The improved hook-up light and glad hand holder 1 of the present invention is best shown in FIGS. 3–7. Device 1 includes a housing, indicated generally at 12, which includes parallel spaced front and rear walls 13 and 14, spaced parallel side walls 15 and 16, and spaced parallel top and bottom walls 17 and 18, which form a hollow interior 20, as shown in FIG. 9. Housing 2 preferably is formed of a high-strength, rust-free plastic material, although it could be formed of sheet metal or various other materials, if desired, without affecting the concept of the invention.

Device 1 further includes a lamp, indicated generally at 22, which is pivotally and rotatably mounted on top wall 17 of housing 12 by a mounting assembly 23. Mounting assembly 23 includes a U-shaped bracket 24 and a vertical bolt or post 25 which extends through housing top wall 17 and the flange wall portion of bracket 24, which will rotatably mount the lamp on housing 12. In addition, a pivot bolt 26 extends horizontally through the vertical spaced legs of U-shaped bracket 24 to pivotally mount the lamp for movement in a direction 90° with respect to its rotational direction on post 25, for illuminating the area behind the tractor. Lamp 22 is of a usual construction which will include a bulb 27 mounted within a lamp housing 28, and may have various configurations without affecting the concept of the invention. Electric power to lamp 22 is supplied through an electric line 29.

In accordance with another feature of the invention, a pair of glad hand holders, each of which is indicated at 30, are mounted on side walls 15 and 16 by bolts 31. Glad hand holders 30 also may be formed of a rigid plastic material or sheet metal, and may have various configurations and are adaptable to hold end couplers 8 of air lines 7, as shown in FIG. 1, and as shown in U.S. Pat. No. 4,092,034. These glad hand holders enable air line couplers 8 to be rotatably mounted and inserted on the holders which will securely hold the couplers when the air lines are disconnected from the trailer.

Housing 12 is mounted on rear panel 2 of a tractor by a pair of bolts 33 (FIG. 9) which extend through a pair of holes 34 formed in rear wall 14 of housing 12. Other types of fasteners, such as screws or lag bolts, can be used instead of bolts 33, if desired, depending upon the particular tractor on which device 1 is to be mounted. However, as readily seen, device 1 can be attached extremely simply and inexpensively by a pair of mounting bolts. Many tractors have spaced threaded bosses or other holes properly spaced on the rear of the tractor for various uses, and thus, for certain tractor applications, will not require any special attachment arrangements or the subsequent drilling of holes.

Figure 8:
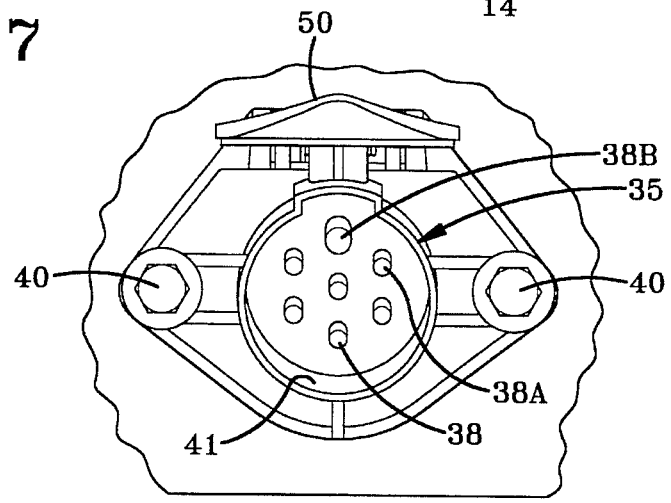
FIG. 8 is a fragmentary front elevational view of the plug receptacle portion of the hook-up light and holder with the lid in open position.

In accordance with one of the main features of the invention, a receptacle or power socket, indicated generally at 35, is mounted within an opening 32 formed in housing front wall 13 and extends into hollow interior 20 of housing 12, as shown in FIG. 9. Receptacle 35 is secured to front wall 13 by a pair of mounting bolts 40, or other types of securing means. As shown in FIGS. 8 and 9, receptacle 35 is provided with seven male prongs 38, which are complementarily shaped to be slidably inserted into holes 39a 39b formed in the end of plug end 10 of power cable 9. Plug end 10 is of the type presently used for many truck tractors and will contain seven holes which communicate with individual internal wires within power cable 9. The individual wires within power cable 9 will provide electricity to the right and left turn signals of the trailer, the trailer stop or brake light, the trailer tail light, the trailer marker lights, and other trailer accessories, as well as a ground connection.

Thus, when plug end 10 is engaged in receptacle 35, the seven male prongs 38 will be seated in socket holes 39 which, in combination with the frictional engagement of the outer wall of plug end 10 with the interior circular wall 41 of receptacle 35, will retain the plug end in a secured stored position within receptacle 35 when disconnected from the trailer receptacle or socket. However, in accordance with one of the main features of the invention, one of the male prongs, indicated at 38A (FIG. 9), is connected by electric line 29 to lamp 22, with another of the prongs 38B being connected to ground through another line 45. Prongs 38A and 38B are received in end plug holes 39A and 39B, respectively, with hole 39A being connected through power cable 9, and a wire 47 to a switch 48 which is located inside of the cab of tractor 3. Switch 48 preferably is a toggle-type switch found in many tractors, which is used to energize the trailer marker lights when power cable 9 is connected to the trailer. In the alternative, switch 48 could be a trolley valve, brake pedal or other existing switch found in many truck cabs for actuating the trailer service brake light or other accessory. When used as an auxiliary brake light, a red bulb or red lens would be used instead of a clear bulb and lens used for illumination purposes. However, when power cable 9 is connected to device 1, actuation of switch 48 by the truck driver will actuate lamp 22 through prong 38A and line 29 to provide illumination at the rear of the tractor to assist in hooking the trailer thereto. This avoids providing additional switches or power supply cables to lamp 22 by utilizing existing power cable 9 and switch 48. Furthermore, device 1 will securely retain plug end 10 of power cable 9 in a secured position within receptacle 35, as well as providing for the pair of glad hand holders 30 for securely retaining coupler ends 8 of air lines 7 when disconnected from the trailer.

Figure 2:
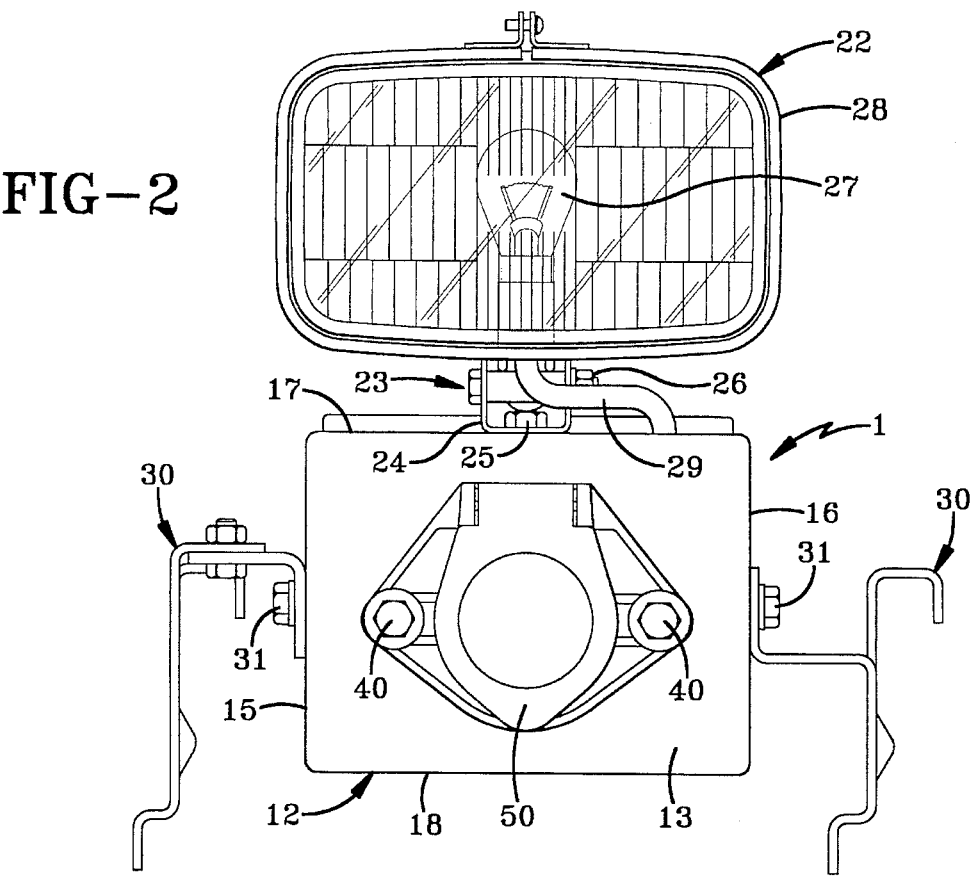
FIG. 2 is an enlarged plan view of the hook-up light and holder removed from the truck of FIG. 1.
Figure 3:
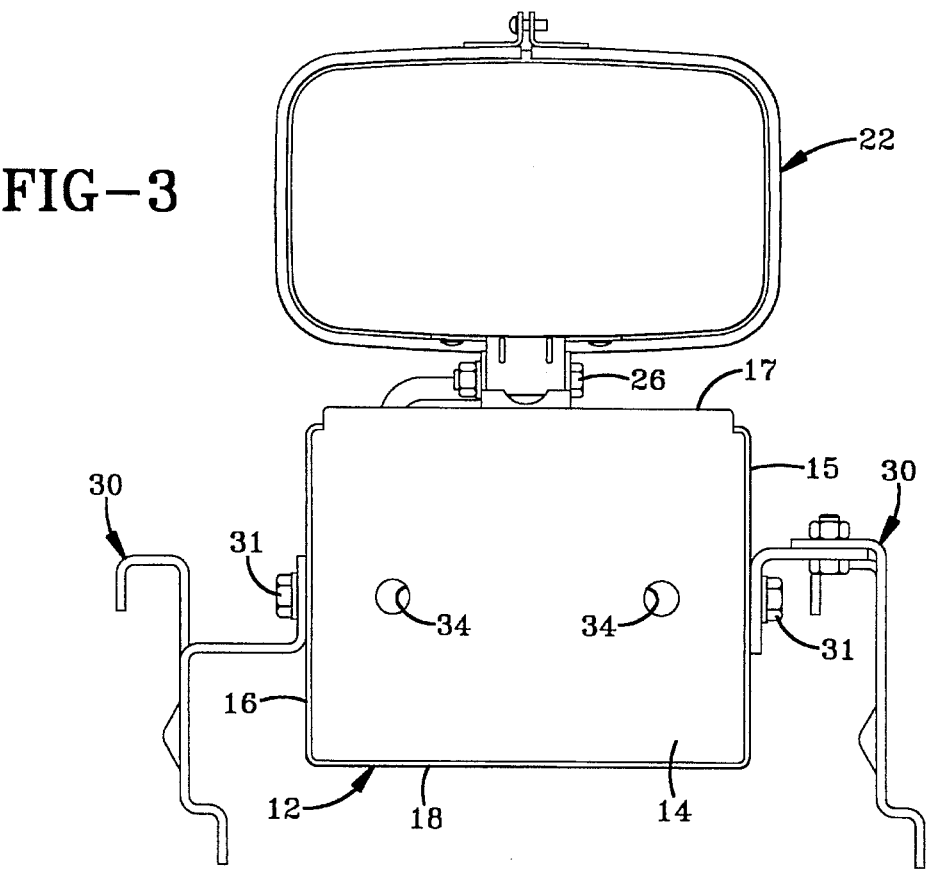
FIG. 3 is a rear elevational view of the hook-up light and holder of FIG. 2.
Figure 4:
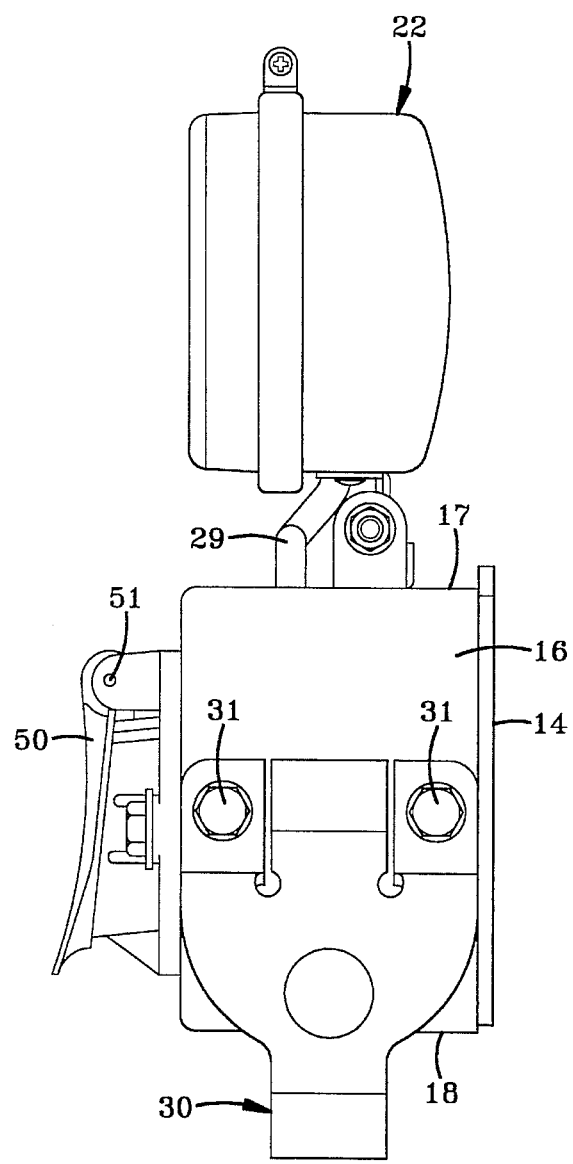
FIG. 4 is a right side elevational view of the hook-up light and holder of FIG. 2.
Figure 5:
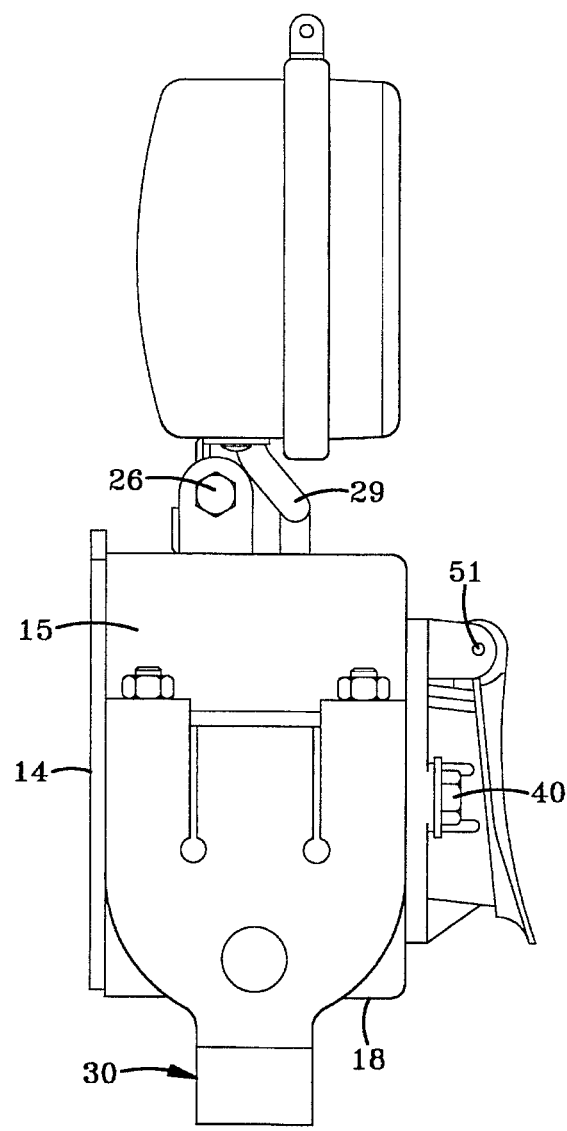
FIG. 5 is a left side elevational view of the hook-up light and holder of FIG. 2.
Figure 6:
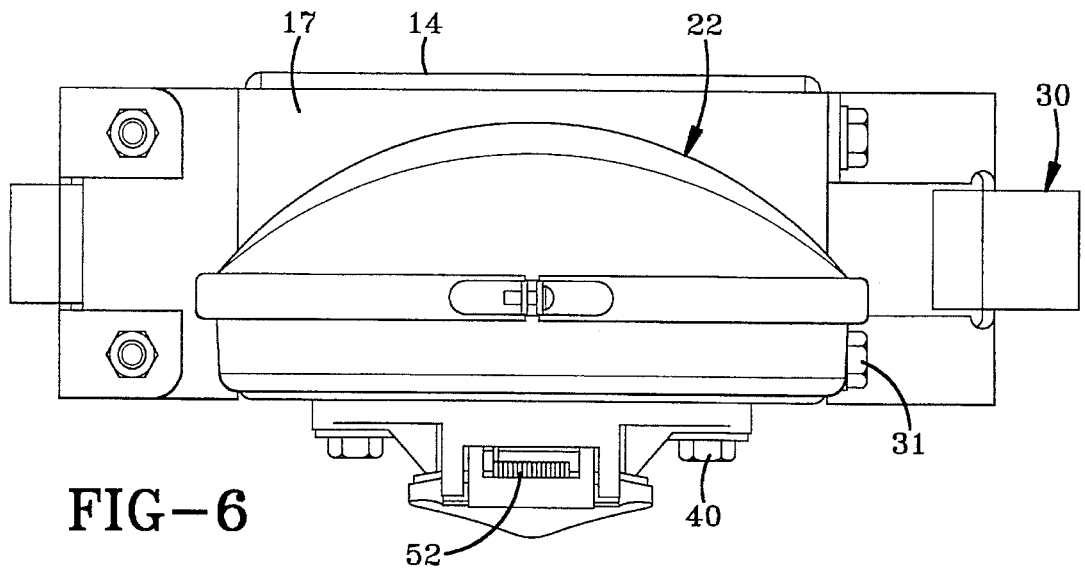
FIG. 6 is a top plan view of the hook-up light and holder of FIG. 2.
Figure 7:
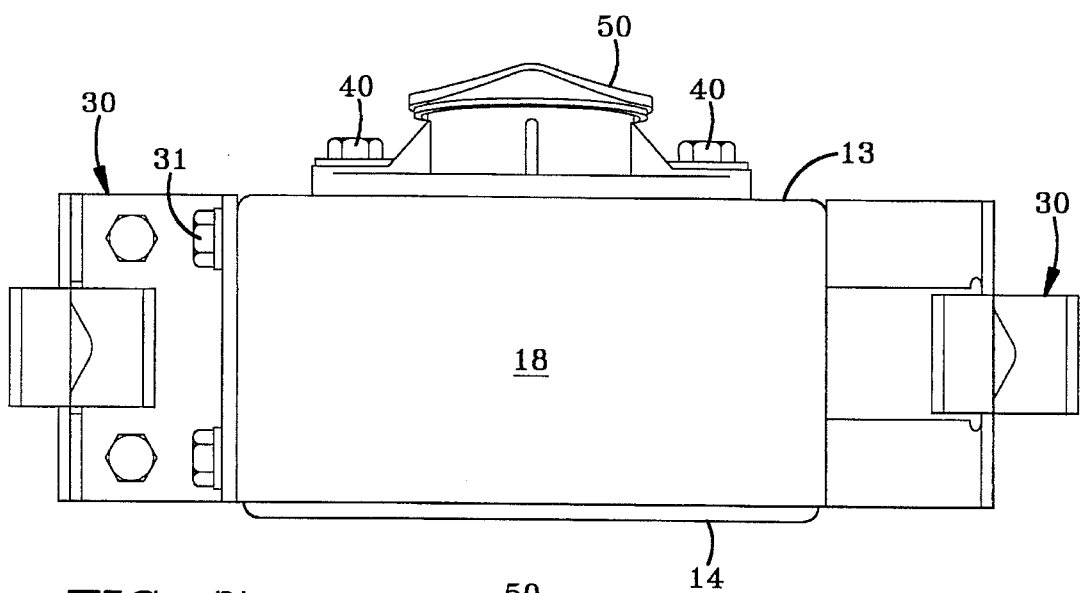
FIG. 7 is a bottom plan view of the hook-up light and holder of FIG. 2.

A closure lid 50 is pivotally mounted by a pivot pin 51 and a biasing spring 52 on the front of receptacle 35, with spring 52 biasing lid 50 toward a closed position, as shown in FIGS. 2, 4 and 5, when plug end 10 is removed from socket 35 to prevent the ingress of dirt and debris into socket 35.

In summary, improved device 1 provides a relatively inexpensive arrangement of parts, many of which can be formed of rust-free, lightweight, high-strength plastic material, which device is easily mounted on the rear panel of a truck tractor by a pair of mounting bolts. The device will hold both the end connectors of a pair of air pressure lines when disconnected from the trailer, as well as securely holding the plug end of the power cable when disconnected from the trailer. Most importantly, device 1, when holding the power cable end, connects the tractor's supply of electricity through a usual switch located within the cab of the tractor to the device for energizing a light pivotally and rotatably mounted on a housing portion of the device, for illuminating the area between the tractor and trailer.

Accordingly, the hook-up light and glad hand holder is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved device is constructed and used, the characteristics of the construction, and the advantageous, new and useful results obtained; the new and useful structures, devices, elements, arrangements, parts and combinations, are set forth in the appended claims.

I claim:

1. A device for mounting on a truck tractor illuminating a working area behind the tractor and for retaining an air line and a plug end of an electrical power cable in a fixed position when the power cable is disconnected from a trailer, said device including:

a housing configured to be mounted in a fixed position on the tractor;

an electrical receptacle mounted in said housing and containing a plurality of male prongs, said male prongs being complementary to electrical sockets formed in the plug end of the power cable said receptacle removably receiving and retaining said plug end when the power cable is disconnected from the trailer;

a lamp configured to be mounted on the housing for illuminating the working area behind the tractor;

an electrical connection electrically connecting the lamp to at least one of the male prongs of the receptacle;

an electrical supply line electrically connecting and extending between said at least one male prong and a control switch configured to be mounted within the tractor for electrically connecting the lamp to an electrical supply of the tractor;

brackets means mounted on the housing and removably retaining at least one air line thereon when the air line is disconnected from the trailer; and fastener means for mounting the housing on the tractor.

2. The device defined in claim 1 including a pivot mechanism pivotally mounting the lamp on the housing.

3. The device defined in claim 2 in which the pivot mechanism includes a post and the lamp rotatably mounted on the housing.

4. The device defined in claim 3 in which the housing includes a top wall; in which the pivot mechanism includes a U-shaped bracket and a pivot pin and the lamp pivotally mounted on said U-shaped bracket; and in which the U-shaped bracket and the pivot pin rotatably mount about the post.

5. The device defined in claim 1 in which the electrical connection is a wire extending between the lamp and electrical receptacle.

6. The device defined in claim 1 in which the bracket means includes two brackets mounted on opposite side walls of the housing for holding end couplings of a pair of air lines which communicate with a supply of pressurized air on the tractor.

7. The device defined in claim 1 in which the housing includes spaced front and rear walls, a spaced pair of side walls, and spaced top and bottom walls, said walls forming a hollow interior within the housing; and in which the receptacle is mounted within an opening formed in the front wall of the housing.

8. The device defined in claim 1 including a spring-biased pivot which pivotally mounts a closure lid on the housing and biases said lid toward a closed position.

9. The device defined in claim 1 in which the fastener means is a plurality of bolts which extend through holes formed in a wall of the housing.

10. In combination:

a truck tractor containing sources of air pressure and electricity, a flexible power supply cable mounted on the tractor and connected to the source of electricity and terminating in plug end containing a plurality of first electrical connectors, and a trailer accessory switch mounted on the tractor connecting the source of electricity to at least one of the first electrical connectors for subsequently connecting the source of electricity to an accessory of a trailer when the trailer is connected to the tractor;

a housing and a lamp mounted on the tractor illuminating a work area behind the tractor;

a receptacle securely mounted on the housing and having a plurality of second electrical connectors matingly engaging with the first electrical connectors of the plug end of the power supply cable to retain the plug end in the receptacle and to electrically connect the lamp to the source of electricity through the trailer accessory switch when the power supply cable is disconnected from the trailer, with at least one of said second electrical connectors of the receptacle being electrically connected to the lamp.

11. The combination defined in claim 10 in which the lamp is pivotally mounted on the housing.

12. The combination defined in claim 10 in which the second electrical connectors of the receptacle are male prongs; and in which the first electrical connectors of the plug end are a plurality of openings.

13. The combination defined in claim 10 in which a pair of air hoses mounted on the tractor communicate with the source of air pressure and extend outwardly from the tractor and terminate in end couplers; and in which bracket means is mounted on the housing for removably holding the end couplers of the air hoses.

14. The combination defined in claim 10 in which the housing is formed of plastic; and in which fasteners secure the housing on the tractor.

15. The combination defined in claim 10 in which a lid is pivotally mounted on the housing and movable between open and closed positions to selectively expose and cover, respectively, the receptacle.

16. The combination defined in claim 10 in which the lamp has a clear bulb and lens for illuminating an area behind the tractor.

17. The combination defined in claim 10 in which the lamp has a colored bulb to provide a warning light behind the tractor when the switch is actuated.

18. The combination defined in claim 17 in which the trailer accessory switch is the tractor brake light switch.

19. The combination defined in claim 10 in which the lamp has a colored lens to provide a warning light behind the tractor.

* * * * *